(12) United States Patent
Miller et al.

(10) Patent No.: US 11,919,829 B1
(45) Date of Patent: Mar. 5, 2024

(54) METHOD OF FERTILIZATION AND/OR IRRIGATION USING POTASSIUM BISULFATE

(71) Applicants: John C. Miller, Fresno, CA (US); Deborah L. Miller, Fresno, CA (US)

(72) Inventors: John C. Miller, Fresno, CA (US); Deborah L. Miller, Fresno, CA (US)

( * ) Notice: Subject to any disclaimer, the term of this patent is extended or adjusted under 35 U.S.C. 154(b) by 0 days.

(21) Appl. No.: 17/933,729

(22) Filed: Sep. 20, 2022

(51) Int. Cl.

| | |
|---|---|
| *C05D 1/02* | (2006.01) |
| *A01C 23/04* | (2006.01) |
| *A01G 25/16* | (2006.01) |
| *C05D 9/02* | (2006.01) |
| *C05G 1/00* | (2006.01) |
| *C05G 5/23* | (2020.01) |

(52) U.S. Cl.
CPC .............. *C05D 1/02* (2013.01); *A01C 23/042* (2013.01); *A01G 25/16* (2013.01); *C05D 9/02* (2013.01); *C05G 1/00* (2013.01); *C05G 5/23* (2020.02)

(58) Field of Classification Search
None
See application file for complete search history.

(56) References Cited

U.S. PATENT DOCUMENTS

| | | |
|---|---|---|
| 3,936,392 A | 2/1976 | Steinmetz |
| 4,342,737 A | 8/1982 | Washita et al. |
| 4,554,151 A | 11/1985 | Worthington et al. |
| 7,638,064 B1 | 12/2009 | Miller et al. |
| 8,568,506 B1 | 10/2013 | Miller et al. |
| 8,628,598 B1 | 1/2014 | Miller et al. |
| 9,148,993 B1 * | 10/2015 | Miller .................. A01C 23/042 |
| 10,271,474 B1 | 4/2019 | Miller et al. |
| 10,981,839 B2 | 4/2021 | Geiger et al. |
| 2010/0006804 A1 | 1/2010 | Sakovich et al. |

FOREIGN PATENT DOCUMENTS

| | | | | |
|---|---|---|---|---|
| CN | 107417307 A | * | 12/2017 | ............... C05D 1/02 |
| EP | 3222584 A1 | * | 9/2017 | ............... C01D 5/16 |
| EP | 3428139 A1 | * | 1/2019 | ............... C05D 1/02 |
| WO | 99/32419 | * | 7/1999 | ............... C05G 1/00 |

* cited by examiner

*Primary Examiner* — Wayne A Langel
(74) *Attorney, Agent, or Firm* — Andrew D. Fortney; Central California IP Group, P.C.

(57) ABSTRACT

A method of fertilizing and/or irrigating a field with water containing potassium bisulfate is disclosed. The method includes adding a predetermined amount of potassium bisulfate to irrigation water for the field, and delivering the mixture of potassium bisulfate and irrigation water to the field. Alternatively, the method may provide potassium bisulfate to crops by applying or spreading the potassium bisulfate onto ground near or proximate to the crops, and allowing water to carry the potassium bisulfate into the ground.

9 Claims, 5 Drawing Sheets

METHOD OF FERTILIZATION AND/OR IRRIGATION USING POTASSIUM BISULFATE

FIELD OF THE INVENTION

The present invention generally relates to the field of fertilization and/or irrigation of agricultural land. More specifically, embodiments of the present invention pertain to a method of fertilizing and irrigating an agricultural field with potassium bisulfate.

DISCUSSION OF THE BACKGROUND

Due to increasing labor, transportation, and raw material costs, agricultural growers require efficient and economical fertilization and/or irrigation (e.g., "fertigation") systems to continue providing abundant food to a growing population at a low cost. Although conventional fertilization and irrigation systems have improved significantly in the past few decades, inefficiencies remain in certain aspects of fertigation systems and methods.

FIG. 1 shows a conventional system 10 for continuous chlorination of irrigation water in the field. The system 10 is disclosed in U.S. Pat. No. 7,638,064, the relevant portions of which are incorporated herein by reference. The irrigation system 10 provides irrigation water to the field under cultivation laid out among hills 4, 6 and 8, which themselves are not under cultivation. The source of irrigation water 20 (e.g., a pond or well) is flanked by hills 4 and 6. Irrigation water is drawn from the irrigation water source 20 by one or more pumps 22 into a main line 32. The main line 32 branches into two lateral lines 40 and 42. Irrigation water flowing to the lateral lines 40 and 42 is controlled respectively by the first and second shut-off valves 46 and 48, each neighboring the intersection 39 of the lateral lines 40 and 42 with the main irrigation line 32. Each lateral line 40, 42 has a plurality of irrigation lines 60 branching off and stretching out along the crops (not shown). Each irrigation line 60 has a plurality of irrigation delivery points (not shown) at which irrigation water is delivered to the crops. At the intersection of each irrigation line 60 and the respective lateral line from which it stems is a riser 62 (small shut-off valve) permitting the halting of water flow to its respective irrigation line 60. A chlorine delivery system 26a is installed downstream of the irrigation pump 22 and either upstream or downstream from a filter 90, which filters solid debris out of the irrigation water flowing through the main water line 32. A fertilizer-nutrient feedstock delivery system 80 adds predetermined amounts of one or more fertilizers and/or nutrients to the main line 32 using a pump or injection system 26b.

FIGS. 2-4 show an alternative system 100 disclosed in U.S. Pat. No. 8,628,598 (the relevant portions of which are incorporated herein by reference) that includes filters and a main line from a point upstream of filters 116 to a point downstream of the filters 116. Fertilizer-nutrient feedstock raw materials are added between these two points.

A segment of a stream of irrigation water that is running between the irrigation-water source (e.g., pond or well 20 in FIG. 1) and the irrigation line(s) in the field(s) is within the system 100. The irrigation water is filtered, and one or more fertilizers derived from one or more feedstock raw materials is/are added. The system 100 includes a control unit 112, optionally a plurality of filters (e.g., sand-media filters) 116, an irrigation-water line (e.g., a pre-filter main line) 118, which feeds irrigation water through each of the filters 116 and through a reaction chamber 114, to a post-filter (and relatively lower pressure) segment of the irrigation-water main line 120. The post-filter main line 120 is a transport pipe that carries irrigation water to one or more agricultural fields, such as the agricultural field 410 shown in phantom, and obviously not to scale, in FIG. 2. One or more secondary transport pipes service a typical agricultural field, such as transport pipes 420. Devices for delivering the irrigation water at points in the field, shown as devices 430, can be overhead sprinklers or micro-devices such as emitters or micro-sprinklers.

The feedstock raw materials are stored in separate storage containers which may be conveniently disposed nearby the control unit 112. As shown, such storage containers include one for each of eight raw materials, namely a sulfuric acid tank 122, a calcium nitrate tank 124, a magnesium nitrate tank 126, a nitric acid tank 128, a phosphoric acid tank 130, a urea tank 132, a potassium hydroxide tank 134 and an ammonium hydroxide tank 136, each in fluid communication with the control unit 112 via raw material feed lines 140. Fewer than eight raw materials may be used, because there are growers who need and/or desire fewer fertilizer nutrients.

There is also one or more raw-material feed lines 140 between the control unit 112 and the reaction chamber 114. The raw-material feed lines 140 run through the interior of the control unit 112 to the reaction chamber 114. For each of the raw materials and raw-material feed lines 140, there is an injection valve 196 along the raw-material feed line 140 upstream from the point at which the feed line 140 enters the reaction chamber 114, shown in FIGS. 3-4.

Irrigation water flows to and through each of the filters 116 through filter feed lines 172. A stream of the irrigation water also flows from the pre-filter main line 118 to the reaction chamber 114 through a reaction-chamber feed line 170, except when the reaction-chamber feed line 170 is closed off. The water flows from the reaction chamber 114 and from each of the filters 116 to the post-filter main line 120.

Referring now in particular to FIG. 3, each of the raw-material feed lines 140 is equipped with a feed pump 174. Each of the feed pumps 174 (except the feed pump 174 along the raw-material feed line 140 from the sulfuric acid feed tank 122 when sulfuric acid is being used solely for pH adjustment, and not as a raw material) is controlled by a flow controller 176 and a master controller 178. The feed pump 174 along the raw-material feed line 140 from the sulfuric acid feed tank 122 when sulfuric acid is being used solely for pH adjustment is controlled by the master controller 178 and a pH controller 180. Each of these feed pumps 174 is in electrical communication with the flow controller 176 and the master controller 178 (the electrical connections are not shown), and injects or pumps in its respective raw material to its respective feed line 140 at a rate determined by the flow controller 176 and the master controller 178. The feed pump 174 along the sulfuric acid feed line 140 is also in electrical communication with the pH controller 180 (the electrical connections are not shown) and pumps sulfuric acid though its respective feed line 140 at a rate determined by the flow controller 176, the master controller 178 and the pH controller 180.

The control unit 112 is divided into two chambers, a lower chamber 182 which houses the feed pumps 174 and a portion of the raw material feed lines 140 upstream from the reaction chamber 114. The lower chamber 182 also houses a pH monitoring system 183 that comprises a pH monitoring-system pump 184, a pH sensor 186, a pH monitor feed line 188 and a pH return line 190. The second chamber of the control unit 112 is an upper chamber 192 that houses the flow controller 176, the master controller 178, the pH controller 180 and a temperature controller 177.

Along each of the raw material feed lines 140 downstream from the respective feed pumps 174 and upstream from the reaction chamber 114 is an injection valve 196, each of which is equipped with a backflow preventer (not shown). Referring now to FIG. 4, along the reaction-chamber feed line 170 are, from upstream (closest to the pre-filter main line 118) to downstream (closest to the reaction chamber 114) an optional booster pump 198, a reaction-chamber feed-line flow meter 200, a reaction-chamber feed-line flow sensor 102 and a reaction-chamber feed-line shut-off valve 104. The line opposite the reaction-chamber feed line 170 is a reaction-chamber discharge line 171 that is open to the post-filter main line 120. Along the reaction-chamber discharge line 171, from upstream (closest to the reaction chamber 114) to downstream (closest to the post-filter main line 120), are a reaction-chamber discharge-line thermocouple 106 and a reaction-chamber discharge-line shut-off valve 108.

The pre-filter main line 118 is open to (i) the reaction chamber 114 through the reaction-chamber feed line 170, and (ii) each of the filters 116 through filter feed lines 172 or openings. Untreated irrigation water 210, shown by flow arrows in FIG. 4, flows through the pre-filter main line 118 and discharges to the reaction chamber 114 and the filters 116 through these respective feed lines or openings.

As noted above, the reaction-chamber discharge line 171 is open to, and discharges to, the post-filter main line 120. In addition, each of the filters 116 is open to, and discharges to, the post-filter main line 120 via filter discharge lines or openings 214. The irrigation water 210 thus flows to the post-filter main line 120 and therein receives the fertilizer-nutrient feedstock discharged from the reaction-chamber discharge line 171. Such treated irrigation water 211 is shown by flow arrows in FIG. 4.

Along the pre-filter main line 118, from upstream (closest to the reaction-chamber feed line 170) to downstream (farthest from the reaction-chamber feed line 170), are a pre-filter main-line pressure sensor 230 and a pre-filter main-line pressure gauge 232. Along the post-filter main line 120, from upstream (closest to the reaction-chamber discharge line 171) to downstream (farthest from the reaction-chamber discharge line 171), are the terminal end 216 of the pH return line 190, the starting end 220 of the pH feed line 188 (along which is a pH line shut-off valve 222 and a solenoid 224), a post-filter main-line pressure gauge 226 and a post-filter main-line flow sensor 228.

The storage containers can vary in size depending on the size and nutrient needs of the irrigation site they serve. Typical storage container sizes are between 300 and 6,500 gallons. The electrical connections between the feed pumps 174 along the raw-material feed lines 140 and the flow controller 176 and master controller 178 each consist separately of an on/off power control (not shown) and a feedback loop (not shown) which controls the output of the respective feed pumps 174. The upper chamber 192, which houses the electrical controls, is isolated from the lower chamber 182 to avoid, or at least inhibit, corrosion of the electrical components of the electrical controls. The housing and/or frame of the control unit 112 generally is preferably constructed of heavy gauge steel that is anodized to inhibit corrosion. It preferably is secured with a high security lock system (not shown) and is preferably anchored to the ground with several long spikes (on the order of 1-2 m; not shown) to prevent tampering and/or theft of the equipment held within the control unit 112.

The flow controller 176 is also in electrical connection (not shown) with the post-filter main-line flow sensor 228 along the post-filter main line 120. Additionally, the pH controller 180 can override the flow controller 176 at times to control the feed pump 174 along the feed line 140 of the sulfuric acid tank 122 to adjust the pH of the treated irrigation water to a target pH. The flow controller 176 proportionately varies the input of the raw materials through the respective feed pumps 174 based at least in part on the flow rate of the treated irrigation water 211, which is read by the post-filter main-line flow sensor 228.

The temperature controller 177 in the control unit 112 is in electrical connection (not shown) with the reaction-chamber discharge-line thermocouple 106 along the reaction-chamber discharge-line 171. The raw materials from the various storage tanks 122-136 are delivered through the respective raw material feed lines 140 and charged to the reaction chamber 114 to make the fertilizer-nutrient feedstock. The components of the fertilizer-nutrient feedstock intermix and (when possible) react with each other as a stream of untreated irrigation water 110 feeds into the reaction chamber 114. Upon such intermixing and reaction, there is an exotherm from the heat of dissolution and reaction(s) of the various raw materials, when they occur. This exotherm is the reason for monitoring the temperature of the fertilizer-nutrient feedstock and irrigation water by the reaction-chamber discharge-line thermocouple 106 as the fertilizer-nutrient feedstock exits the reaction chamber 114. If that temperature is undesirably high, for instance 40° C. or higher, the temperature controller 177 sends a feedback signal to the master controller 178, and the master controller 178 shuts off the feed pumps 174 until the temperature detected by the reaction-chamber discharge-line thermocouple 106 decreases to below a threshold temperature. This off/on sequence is repeated until a safe temperature (below the threshold) is continuously detected by the reaction-chamber discharge-line thermocouple 106.

The pH controller 180 is electrically connected (not shown) to the pH monitoring system 183. The pH controller 180 controls the pH of the treated irrigation water 211 as it leaves the system 100. The pH of the treated irrigation water 211 is monitored by diverting a small stream of treated irrigation water 211 via the starting end (e.g., a pH monitor tap) 220 and the pH feed line 188 (see FIG. 3) to the pH sensor 186. Based on the pH of the treated irrigation water 211 and the fertilizer composition being produced in the reaction chamber 114, the pH controller 180 increases or decreases the feed of acid(s) and/or base(s) to the post-filter main line 120 to achieve a constant target pH for the treated irrigation water 211. The target pH is typically a pH of about 6.5. The feed pump 174 along the feed line 140 from the sulfuric acid tank 122 is at times activated when the target pH cannot be maintained by adjustments to the feed pumps 174 of the nitric acid and/or phosphoric acid tanks 128, 130 because sulfuric acid generally has little or no nutrient value. If the target pH can be obtained by slight additional amounts of nitric and/or phosphoric acid (both of which contain an NPK nutrient), then the use of nitric and/or phosphoric acid to adjust the pH is preferable, although the use of sulfuric acid for pH adjustment can at times be more practical. Typically, the target pH, which generally is between 6.5 and 7, is lower than the pH of the untreated irrigation water, because untreated irrigation water is usually slightly alkaline. Of course, a base (e.g., KOH, NH$_4$OH) is used for pH adjustment if the target pH is higher than the pH of the treated irrigation water.

The master controller 178 automatically turns the system 100 on. The master controller 178 is electrically connected (not shown) both to the pre-filter main-line pressure sensor 230 and the reaction-chamber feed-line flow sensor 102. When a minimum pressure (typically 15 psi) is seen at the pre-filter main-line pressure sensor 230 and a minimum flow of water (typically twenty gallons per minute) is seen at the reaction-chamber feed-line flow sensor 102, the master controller 178 actuates the feed pumps 174 and the injection valves 196, along with any other component in the system 100 that facilitates the treatment of the untreated irrigation water. Upon such actuation, raw materials start feeding to, and mixing and reacting in, the reaction chamber 114. The master controller 178, pre-filter main-line pressure sensor 230 and reaction-chamber feed-line flow sensor 102 are typically always in an active state. The master controller 178 generally does not allow such actuation unless both the minimum pressure and the minimum flow rate criteria are met. When the feed pumps 174 and injection valves 196 are actuated, the master controller 178 automatically shuts down the feed pumps 174 and injection valves 196 when either of the values seen at the pre-filter main-line pressure sensor 230 and the reaction-chamber feed-line flow sensor 102 falls below its respective minimum, and automatically restarts the feed pumps 174 and injection valves 196 when both of the pressure and flow rate values meet or exceed the respective minima.

When the flow of untreated irrigation water 210 begins, it flows (a) through the pre-filter main line 118, (b) to and through the filters 116, (c) through the post-filter main line 120, and (d) to the irrigation lines in the field(s) (not shown). The master controller 178 actuates the feed pumps 174 and injection valves 196 when the irrigation water is at the normal or expected pressure and flow rate. The flow of irrigation water occurs regardless of actuation of the feed pumps 174 and injection valves 196.

Based on the nutrient-application profile (e.g., the type[s] and amount[s] of nutrients for a given time period in a given crop cycle), the master controller 178 automatically determines and sets the correct synchronizations of the feed pumps 174 to provide the feedstock raw materials to create in situ the nutrient feedstock for the crop(s). Typically, the nutrient feedstock is created in a manner avoiding conflicting interactions (such as, e.g., formation of a precipitate or other poorly soluble or insoluble material) between feedstock raw materials in the reaction chamber 114 or downstream therefrom.

When filters 116 are in the path of the irrigation water between the pre-filter main line 118 and post-filter main line 120, there is normally a small but significant water-flow pressure drop across the filters 116. A flow rate of at least 20 gallons per minute or more of untreated irrigation water 110 through the reaction chamber 114 is preferred, and the optional booster pump 198 is provided to increase the flow rate in the post-filter main line 120 if the pressure drop across the filters 116 results in a lower flow rate through the reaction chamber 114, or if a higher flow rate is required to maintain a reaction chamber temperature below 40° C.

The reaction-chamber feed-line flow meter 200 determines the flow rate of untreated irrigation water 210 to and/or through the reaction chamber 114. The reaction-chamber feed-line flow sensor 102 determines if the untreated irrigation water 210 is flowing to and/or through the reaction chamber 114. The flow of raw materials to the reaction chamber 114 will not be permitted unless untreated irrigation water 210 is flowing through the reaction chamber 114.

The reaction-chamber feed-line shut-off valve 104 is not generally an active element. It is an optional, and typically manual, component. The reaction-chamber feed-line shut-off valve 104 and the reaction-chamber discharge-line shut-off valve 108 (which likewise is an optional, and typically manual, component) can be conveniently used together to isolate the reaction chamber 114 from the flows of irrigation water for maintenance or repair purposes, if needed or desired. When the reaction-chamber feed-line shut-off valve 104 and the reaction-chamber discharge-line shut-off valve 108 are open (or not present), a relatively small stream of untreated irrigation water 210 flows through the reaction chamber 114 whenever the irrigation water is flowing to the fields (not shown), regardless of whether raw materials are being fed to the reaction chamber 114 or not.

At or along the starting end 220 of the pH feed line 188 is a pH feed-line shut-off valve 222. At or along the terminal end 216 of the pH return line 190 is a pH return-line shut-off valve 223. The pH feed-line shut-off valve 222 and the pH return-line shut-off valve 223 are not normally active elements of the system 100 but instead are optional, and typically manual, components that can be used together to isolate the pH monitoring system 183 from the flows of irrigation water for maintenance or repair purposes, if needed or desired, without discontinuing the irrigation water flow through the remainder of the system 100.

The small stream of treated irrigation water 211 that is diverted from the post-filter main line 120 at the starting end 220 of the pH feed line 188 feeds into the pH monitoring system 183 through the pH feed line 188. The pH of that stream is read by the pH sensor 186. The pH monitoring-system pump 184 pumps the stream through the pH monitoring system 183, and is controlled by the master controller 178.

The solenoid 224 shuts off the flow of treated irrigation water 211 from the post-filter main line 120 through the starting end 220 of the pH feed line 188 when the water-flow pressure at the pre-filter main-line pressure sensor 230 and/or at the reaction-chamber feed-line flow sensor 102 drops below a predetermined threshold value. The solenoid 224 is in electrical connection (not shown) with the master controller 178.

The filters 116 are typically large, for instance 300 gallons, and may comprise stainless-steel (e.g., in the housing, internal frame work, etc.). Such filters are routinely used by growers to remove debris from untreated irrigation water before it enters the irrigation system in the fields. The filters 116 generally and preferably comprise conventional agricultural irrigation filters. As the untreated irrigation water 210 passes through the filters 116, the flow of the untreated irrigation water 210 is restricted, and that flow restriction causes a small but significant pressure drop across the filters 116. The pressure drop is typically in the range of from 5 to 15 psi, but can be higher as debris builds up in the filter, and typically causes a pressure differential between the pre-filter main line 118 and the post-filter main line 120. This pressure differential facilitates a large (e.g., fast) flow of untreated irrigation water 210 through the reaction chamber 114 that can temper or mitigate the temperature increase resulting from the exotherms in the reaction chamber 114. The booster pump 198 is available to increase and/or maintain the water flow rate through the reaction chamber 114, and it is recommended for irrigation systems that do not have a large enough pressure differential across the filters 116 to provide cooling in the reaction chamber 114 when the fertilizer-nutrient feedstock is charged therein.

The flow of untreated irrigation water 210 water through the reaction chamber 114 is large compared to the feed rate (injection rate) of the raw materials into the reaction chamber 114. As a result, the exotherm(s) caused by the addition of the fertilizer-nutrient raw materials to the reaction chamber 114 typically do not cause intolerable or unacceptable temperature increases. It is generally believed that reactions between the various raw materials (i.e., components of the fertilizer-nutrient feedstock) occur in the reaction chamber 114, prior to discharge into the post-filter main line 120. Thus, the levels (e.g., quantities and/or concentrations) of raw materials that can be charged to the reaction chamber 114 depend at least in part on the size of the reaction chamber 114. For given levels of given raw materials, the reaction chamber 114 and the stream of water flowing through it must be sufficiently large to dampen and/or mitigate the exotherms generated.

FIG. 5 shows an automatic fertilization and/or irrigation system 500 that can monitor and adjust the pH of treated irrigation water. The system 500 is disclosed in U.S. Pat. No. 10,271,474, the relevant portions of which are incorporated herein by reference. The automatic fertilization and/or irrigation system 500 is configured to controllably add a plurality of fertilizers, nutrients and/or micronutrients to irrigation water (thereby producing treated irrigation water) and to control the pH of the treated irrigation water. The automatic fertilization and/or irrigation system 500 includes, an automatic fertilization and/or irrigation apparatus 300, a plurality of fertilizer, nutrient and/or micronutrient tanks 515a-d, an acid tank 520, a main irrigation water line 510, and fertilizer, nutrient and/or micronutrient supply conduits 530a-e and feed conduits 540a-e.

Each of the tanks 515a-d is adapted to contain and supply an aqueous solution of one or more fertilizers, nutrients and/or micronutrients. Typically, a first one of the tanks 515a-d contains and supplies a nitrogen-containing fertilizer and/or nutrient, a second one of the tanks 515a-d contains and supplies a phosphorous-containing fertilizer and/or nutrient, and a third one of the tanks 515a-d contains and supplies a potassium-containing fertilizer and/or nutrient, although other configurations are possible. In many cases, the tanks 515a-d that contain and supply the nitrogen-containing, phosphorous-containing and/or potassium-containing fertilizer and/or nutrient also contain and supply one or more additional fertilizers and/or nutrients. In various embodiments, a fourth one of the tanks 515a-d may contain and supply a micronutrient mixture. Alternatively or additionally, one of the tanks 515a-d may contain and supply an acid or base, alone (e.g., aqueous sulfuric or phosphoric acid) or in combination with a nitrogen-containing, phosphorous-containing and/or potassium-containing fertilizer and/or nutrient (e.g., aqueous ammonium hydroxide or aqueous KOH).

The acid tank 520 in the embodiment shown in FIG. 5 contains and supplies a concentrated acid, for continuously adjusting untreated irrigation water having a neutral or slightly alkaline pH to a neutral or slightly acidic pH. In one example, the acid tank 520 contains and supplies concentrated aqueous sulfuric acid, but other acids are also acceptable (e.g., concentrated aqueous phosphoric acid, which also provides phosphorous; concentrated aqueous nitric acid, which also provides nitrogen; aqueous formic acid, which also provides carbon and may reduce or eliminate scaling in the system 500 and/or the irrigation water supply conduits thereof; etc.). Alternatively, when the tank 520 has a larger volume that some or all of the tanks 515a-d, the tank 520 may contain and supply a relatively high-volume fertilizer and/or nutrient (e.g., a nitrogen- and/or potassium-containing fertilizer and/or nutrient), and one of the tanks 515a-d may contain and supply the acid or base.

Each of the fertilizer, nutrient and/or micronutrient supply conduits 530a-e includes a corresponding first valve 532a-e configured to control (e.g., open, close, and optionally restrict) a flow of the corresponding fertilizer, nutrient and/or micronutrient from the corresponding tank 515a-d or 520 to a unique or corresponding one of the pumps 360a-d and 370. Each of the fertilizer, nutrient and/or micronutrient feed conduits 540a-b and 540d-e includes a corresponding second valve 542a-d configured to control the addition of the corresponding fertilizer, nutrient and/or micronutrient by the corresponding pump 360a-d or 370 to the main irrigation line 510. The fertilizer, nutrient and/or micronutrient feed conduit 540c may have two valves 544a-b configured to control the addition of the acid (or, alternatively, a relatively high-volume fertilizer and/or nutrient) to the main irrigation line 510.

As shown in FIG. 5, a recirculation input 345 can include a sampling conduit 347, configured to withdraw a sample of the treated irrigation water a predetermined distance (e.g., 3-40 feet, 1-10 m, or any distance or range of distances therein) along the main irrigation water line 510, downstream from the location at which the fertilizer, nutrient and/or micronutrient feed conduits 540a-e inject the corresponding fertilizer(s), nutrient(s), micronutrient(s), acid or base into the main irrigation line 510. The recirculation output 346 returns the sampled treated irrigation water to the main irrigation water line 510 in the same or a similar manner as the feed conduits 540a-e.

The automatic fertilization and/or irrigation apparatus 300 may include a power input, a power transformer, a wireless switch or router, a programmable logic controller (PLC), a serializer/deserializer, one or more variable frequency drives, one or more safety relays, a human-machine interface (HMI), a recirculation pump equipped with a recirculation input, a recirculation output and a recirculation filter, a pH probe, a flow switch, a plurality of feedstock component pumps, each of which may be equipped with a fan, an acid pump, and a flow and/or pressure switch, although the apparatus is not limited to or required to include these components. The apparatus 300 may also include a container configured to house all of its components. In use, the container may be sealed and/or locked, and may be configured to provide a substantially waterproof housing for the components enclosed therein.

The wireless switch or router in the apparatus 300 is a gateway for receiving and transmitting data (e.g., digital packets including a header and a body) wirelessly to and from a network (e.g., over the internet). The wireless switch or router may be connected (e.g., by a serial wire or cable, using an ethernet protocol) to a network interface (e.g., network card) in the PLC, and may also include or be directly connected to an antenna that transmits and receives wireless signals (e.g., to and from a cellular network, such as a 3G or LTE network).

The serializer/deserializer (SERDES) connects the wireless switch or router and the PLC, and converts (i) serial data from the wireless switch or router to parallel data for processing by the PLC, as well as (ii) parallel data from the PLC to serial data for transmission by the wireless switch or router. Alternatively, the switch or router may transmit and receive electrical signals using a ground-based network (e.g., a cable, telephone/DSL, or fiber-optic network).

The data from the PLC may include site information (e.g., nutrient delivery amounts and/or rates, one or more pH values of the irrigation water, irrigation on/off times, differences from target values, etc.), and may be organized into a table to be stored in a database (e.g., a SQL database) on a remote server. The PLC may include one or more input modules, one or more output modules, a central processing unit (CPU), and one or more arithmetic logic units (ALUs). The PLC may be implemented and/or may include one or more microprocessors, microcontrollers, field programmable gate arrays (FPGAs), complex programmable logic devices (CPLDs), application specific integrated circuits (ASICs), or application specific standard products (ASSPs). The PLC may include volatile memory (e.g., cache memory, random access memory [RAM]), nonvolatile memory (e.g., fuses, read-only memory [ROM], erasable and programmable memory [EPROM, EEPROM, or flash memory], or a solid-state drive), or both. The nonvolatile memory (or other tangible storage medium) may store basic instructions such as a basic input/output system (BIOS), identification code, and/or a program (instructions to be executed by the CPU) that controls the pumps 360a-d and/or 370.

The input modules may receive input data from the pH probe in the apparatus 300, the pumps 360a-d and 370, and sensors in or operably linked to pumps 360a-d and 370. The output modules may transmit performance data for the apparatus 300 to the SERDES and control signals to the variable frequency drives to control the pumps 360a-d and 370. For example, if the input data (e.g., from a flow sensor operably linked to one of the pumps 360a-d) indicates that the pump is delivering too little of a fertilizer or nutrient, the program may generate performance data and/or a control signal to a corresponding variable frequency drive to increase the speed of the pump. The performance data may be stored in the memory to be later transmitted to an end user (e.g., a data analyst) using the wireless switch or router.

The PLC may receive both digital and analog input signals and provide both digital and analog output signals. For example, some of the analog input signals may be connected to level sensors (e.g., optical or sonar level sensors) that detect the volume of liquid in chemical tanks or vessels 515a-d and 520 that provide the fertilizer, nutrient or micronutrient to the pumps 360a-d and 370. If the volume of liquid in one of the tanks or vessels is too low, an alarm may be triggered, and the program may instruct a variable frequency drive (e.g., using one or more analog outputs) to shut off the corresponding pump. Some of the digital inputs may comprise outputs from the HMI.

The program in the PLC may organize the data into digital packets to be transmitted to a remote user (e.g., a data analyst) using the wireless switch or router. The HMI may be configured to output various signals to the PLC, thereby allowing a user such as a field technician to change settings (e.g., fertilizer or nutrient targets, irrigation cycles, etc.) in the PLC using a graphical user interface (GUI) on the HMI. The HMI thereby functions as a user portal to the PLC and the programming therein, allowing the user to make changes to the system controlled by the PLC without directly making changes to the PLC programming. The GUI may be accessible using buttons and/or a touch screen. In alternative embodiments, the HMI may be a smartphone, laptop, tablet or other computer application, and the PLC may be connected wirelessly to the smartphone, laptop, tablet or other computer to change settings in the PLC.

The variable frequency drive(s) control the pumps 360a-d and 370 based on control signals from the PLC. Values and/or on-off cycles of the control signals correspond to the settings and/or the performance data in the PLC. The variable frequency drive(s) may vary the voltage, frequency and/or pulse width(s)/duty cycle(s) of the control signals to the pumps 360a-d and/or 370, and may comprise pulse-width modulation (PWM) drives, current source inversion (CSI) drives or voltage source inversion (VSI) drives. If any of the pumps 360a-d and/or 370 require pulsed signals (e.g., the pump is solenoid-driven), the PLC may provide the pulsed signal(s) through one or more high-speed outputs wired to one or more corresponding optical (e.g., solid state) relays directly wired to the pump.

The recirculation input 345 receives sampled water to be tested, and the recirculation output 346 returns the sampled water to the main irrigation line 510. The recirculation pump in the apparatus 300 pulls a sample of the irrigation water from the main irrigation line 510 through the recirculation input 345. The irrigation water sample is taken from the main irrigation line 510 at a location downstream from the locations where the pumps 360a-d and 370 and/or the apparatus 300 introduce or inject the fertilizers, nutrients and/or micronutrients into the main irrigation line 510. The recirculation input 345 may also include multiple bends, turns, and/or changes in dimensions to ensure thorough mixing prior to measurement of one or more parameters and/or characteristics (e.g., pH) of the irrigation water. The irrigation water sample passes through a recirculation filter (not shown) that may function as (1) a flow switch to allow the water sample to flow into a monitoring system and/or (2) a filter to remove undissolved particles above a predetermined size (e.g., using a mesh strainer or other filtering material). The pH probe measures the pH of the irrigation water sample with the fertilizers, nutrients and/or micronutrients added thereto, and may transmit the pH data to the PLC.

The PLC may then transmit the pH data to a remote computer via the wireless switch or router and, depending on the difference between the measured pH and a target pH, a variable frequency drive to adjust (e.g., increase or decrease the speed, frequency and/or stroke of) the pump providing acid or base to the irrigation water. Alternatively, if one of the fertilizers, nutrients and/or micronutrients is an acid or base, a corresponding variable frequency drive may adjust the speed, frequency and/or stroke of a corresponding pump 360. The flow switch in the apparatus 300 allows the sampled water to return to the main line through the recirculation output 346.

The pumps 360a-d each control the addition of one or more fertilizer, nutrient and/or micronutrient components to the main line. For example, each of the pumps 360a-d may control the feed rate of a fertilizer, nutrient or micronutrient to the irrigation water in the main irrigation line 510. The fertilizers and/or nutrients may comprise one or more sources of nitrogen, phosphorous, potassium, carbon, and/or calcium. The micronutrients generally comprise an element or chemical provided in small or trace amounts or concentrations, such as boron, zinc, manganese, iron, copper, cobalt, magnesium, molybdenum, etc. The pumps 360a-d may also control the addition of other supporting chemicals or additives (e.g., an acid or base, etc.). Fans on top of the pumps 360a-d may cool the pumps 360a-d to prevent overheating.

The pump 370 is similar or substantially identical to the pumps 360a-d, but in FIG. 5, the pump 370 is larger than the other pumps 360a-d to provide a higher output than the other pumps. However, in many cases, the pump 370 is identical to or smaller than the other pumps 360a-d. In one example, the pump 370 controls the addition of acid to the main irrigation line 510. Alternatively, the pump 370 may control the addition of base or a relatively high-volume fertilizer and/or nutrient, such as a nitrogen- or potassium-containing fertilizer and/or nutrient, to the main irrigation line 510. Each of the pumps 360a-d and 370 may include an AC motor electrically connected to a corresponding variable frequency drive. Each of the pumps 360a-d and 370 is also connected to a chemical tank (e.g., one of the fertilizer/nutrient tanks 515a-d or the acid tank 520) using feed lines. Each of the pumps 360a-d and 370 may be a positive displacement or a centrifugal pump.

Set-up of acid (e.g., $H_2SO_4$, although any acid may be used) and base (e.g., KOH, although any base may be used) for neutralization (e.g., pH balancing) may be performed automatically in the present apparatus 300 by initiating operation of the acid and base pumps (e.g., one of the pumps 360a-d providing the base and the acid pump 370) at a relatively low speed or feed rate (e.g., a minimum speed or rate), then slowly increasing the speed of the acid and base pumps with the corresponding variable frequency drives while monitoring the pH of the resulting irrigation water until the base (e.g., KOH or $NH_4OH$) attains its target setting, unless the pH falls outside a predetermined and/or desired range, in which case the acid is adjusted (e.g., the speed of the acid pump 370 is increased or decreased) to bring the pH within the predetermined and/or desired pH range. In some embodiments, aqueous KOH is preferred over aqueous $NH_4OH$, as external heat (e.g., on a warm summer day) can cause undesirable increases in pressure in a tank or vessel storing aqueous $NH_4OH$. All parameters are adjustable. Any subsequent automatic changes in the base feed rate (e.g., the pump output of the base) may be executed slowly to allow for the control of the pH without large fluctuations.

Fertilizer, nutrient and other chemical tank levels may be measured using sonar or optical sensors. The accuracy of this measurement is controlled or determined by the sensor accuracy. This measurement avoids errors related to human measurements from a baseline (e.g., the bottom of the tank, the ground, and/or the height of the liquid along the sides of the tank).

The apparatus 300 enables continuous tank level monitoring, which also provides the ability to detect tank leaks before a large amount of material has left the tank. Detection of a significant change in a tank level that cannot be explained by normal usage can trigger an alarm that may be transmitted using SMS, email, etc., to one or more persons (e.g., a field technician, data analyst or account manager) to notify the person(s) that corrective action may be necessary. Also, when a tank level sensor determines that the chemical tank is empty (or nearly empty), the PLC can set the corresponding variable frequency drive to zero, and transmit a notice to a user to take corrective action (e.g., to ship or send the corresponding fertilizer[s], nutrient[s] and/or micronutrient[s] to the site). This action also prevents the corresponding pump 360a-d or 370 from running dry, which may cause significant damage.

The outputs of the pumps 360a-d and 370 may be frequently or substantially continually monitored by the PLC, which can send one or more commands to the corresponding variable frequency drive(s) to change the pump speed, and optionally a servo/stepper motor-type control of the stroke setting, thereby changing the pump output (e.g., to meet a defined or modified volumetric demand). Over- and under-feeds can be minimized (typically less than 2%) based on weekly targets, resulting in nearly linear feed rates (e.g., over the course of a growing schedule or crop cycle).

The output of each pump may be calculated automatically by the PLC, based on fertilizer/nutrient targets, flow rates, concentrations of fertilizers/nutrients in the tanks, irrigation hours (e.g., irrigation water and fertilizer/nutrient pump on/off times), etc., thus reducing the possibility of human error. A theoretical pump stroke setting is calculated and recommended to the user. Pump outputs may be adjusted remotely at any time. Pump performance may be monitored periodically (e.g., every 3 minutes, 15 minutes, hour, 2 hours, 4 hours, etc.) or continuously, and alarms may be triggered for poorly performing pumps. Alarms such as pump alarms, pH alarms and irrigation flow alarms can be configured to shut down the entire system, and optionally, latch or record some or all system information in an on-board memory (e.g., in case power is shut off or disconnected).

As described above, some fertilizers may be synthesized in the reaction chamber 114 (FIGS. 2-4), or in the main line 32 (FIG. 1) or 510 (FIG. 5), downstream from the pump(s) and/or the filter. For example, potassium sulfate may be synthesized by reacting potassium hydroxide solution (50% by weight) with sulfuric acid solution (93% by weight), each of which is stored in a tank (e.g., tanks 122 and 134, or 515a and 520) and fed in relatively small amounts to the reaction chamber 114 or the main line 32/510 downstream from the pump(s) 22 (and optionally downstream from the filter 90 in FIG. 1) or pumps 360a and 370 (FIG. 5):

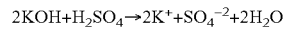

$$2KOH + H_2SO_4 \rightarrow 2K^+ + SO_4^{-2} + 2H_2O$$

However, both KOH and $H_2SO_4$ are extremely caustic and dangerous to handle. The reaction between potassium hydroxide solution and sulfuric acid is highly exothermic. Furthermore, potassium sulfate ($K_2SO_4$) has relatively limited solubility in water (about 8% by weight, depending on the temperature). Thus, a need is felt for a solution to issues relating to use of certain chemicals such as potassium hydroxide solution and sulfuric acid in conventional fertigation systems.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a method of fertilizing and/or irrigating a field (e.g., an agricultural field containing one or more crops), comprising adding a predetermined amount of potassium bisulfate ($KHSO_4$) to irrigation water for the field, and delivering the mixture of potassium bisulfate and irrigation water to the field. The potassium bisulfate may be added to the irrigation water over a predetermined period of time using a pump (e.g., in an irrigation/fertigation system such as system 10 in FIG. 1, or system 100 in FIGS. 2-4), in which case the method may further comprise controlling one or more settings of the pump using a controller in electrical communication with the pump. The settings of the pump are configured to provide the predetermined amount of the potassium bisulfate to the irrigation water over the predetermined period of time.

In some embodiments, adding the potassium bisulfate may comprise adding (1) sulfuric acid and (2) an aqueous solution of potassium sulfate providing a molar ratio of sulfuric acid to potassium sulfate of 1.2:1 to 0.8:1, or any ratio or range of ratios therein (e.g., 1.1:1 to 0.9:1, about 1:1, etc.). In such embodiments, the sulfuric acid and the potassium sulfate may mix and/or react in the irrigation water to form potassium ions ($K^+$), hydrogen ($H^+$) and/or hydronium ions ($H_3O^+$), sulfate ions ($SO_4^{2-}$), and possibly a small amount of bisulfate ions ($HSO_4^-$), depending on the pH. Thus, the molar ratio of sulfuric acid to potassium sulfate may form (1) potassium ions and (2) hydrogen and/or hydronium ions in the irrigation water in a ratio of 1.2:1 to 0.9:1. Alternatively, the molar ratio of sulfuric acid to potassium sulfate may form (1) potassium ions and (2) sulfate ions in the irrigation water in a ratio of 1.25:1 to 0.9:1.

In other embodiments, adding the potassium bisulfate may comprise adding an aqueous solution of potassium bisulfate to the irrigation water. For example, the aqueous solution of potassium bisulfate may be added in an amount sufficient to provide the irrigation water with a concentration of potassium (as $K_2O$) of from 1 to 1000 ppm, or any concentration or range of concentrations therein (e.g., 2 to 500, about 5 to 100, etc.). The aqueous solution of potassium bisulfate added to the irrigation water may contain potassium bisulfate in a concentration of 1-35% by weight, or any concentration or range of concentrations therein (e.g., by weight, 12-33% by weight, 15-35% by weight, etc.). Alternatively, the potassium bisulfate in the aqueous solution may be present in a concentration of 0.35-12% as $K_2O$, or any concentration or range of concentrations therein (e.g., 1-12%, 3-12%, 5-12%, 8.5-12%, etc., as $K_2O$).

In some embodiments, adding the potassium bisulfate to the irrigation water results in the irrigation water having a pH of 4.5 to 6.5. This is generally the result of having excess hydrogen and/or hydronium ions in the irrigation water, and/or of avoiding addition of potassium hydroxide. When the pH of the irrigation water is in the lower part of this range (e.g., 4.5 to about 5.5), the excess hydrogen and/or hydronium ions can help free metal ions such as iron, manganese and zinc for absorption by the crops. However, certain embodiments of the method may further include adding a nitrogen source such as aqueous ammonium hydroxide to the irrigation water, which can neutralize some or all of the excess hydrogen and/or hydronium ions in the irrigation water, and raise the pH of the irrigation water (e.g., closer to or in the range of 6.5-7.5).

The present method can mix and deliver the potassium bisulfate in a variety of ways, including continuous fertigation, semi-continuous or periodic fertigation, or slug feeding. In continuous, semi-continuous or periodic fertigation, the potassium bisulfate is added to the irrigation water over a relatively long period of time (e.g., 2 to 8 hours, 4-6 hours, etc.) using a pump. The setting(s) of the pump are controlled using a controller in electrical communication with the pump, and are configured to provide the predetermined amount of the potassium bisulfate to the irrigation water over the predetermined period of time. The addition of the potassium bisulfate may be considered continuous when it occurs every time the field and/or crops are irrigated for a plurality of days, weeks or months (e.g., 7 or more days, 14 or more days, 30 or more days, 3 or more months, etc.). The addition of the potassium bisulfate may be considered semi-continuous or periodic when it occurs every n-th time the field and/or crops are irrigated (e.g., where n is an integer of at least 2), typically for a period of time similar to continuous addition (e.g., 7 or more days, 14 or more days, 30 or more days, 3 or more months, etc.). Thus, the method may further comprise repeating the method every x days, or y days per week, over z days, where x is an integer of 1 to 7, y is an integer of 1 to 3, and z is an integer of at least 14. Addition by slug feeding occurs in a single addition (e.g., on one day, over the course of minutes to hours; for example, from 15 minutes to 4 hours), without subsequent addition of potassium bisulfate for a relatively long period of time (e.g., 30 or more days, 3 or more months, a year, etc.).

In some embodiments of continuous, semi-continuous or periodic addition of potassium bisulfate, the method may further comprise storing in a controller (i) a target for the predetermined amount of potassium bisulfate to add to the irrigation water and (ii) settings for a pump corresponding to the predetermined amount of potassium bisulfate to be added over the length of time, comparing actual amounts of the potassium bisulfate delivered over the length of time with the target, and adjusting the settings for the pump to move the actual amount of potassium bisulfate delivered over the length of time towards the target using the controller. In such embodiments, the pump adds the predetermined amount of potassium bisulfate to the irrigation water.

Other or further embodiments of the method may further comprise adding a nitrogen source, a phosphorous source, a carbon source, and/or one or more micronutrients to the irrigation water. The nitrogen source may comprise aqueous ammonium hydroxide, urea, an ammonium salt (e.g., ammonium nitrate, ammonium nitrite, ammonium sulfate, ammonium phosphate, formamide, acetamide, ammonium carbonate, ammonium acetate, etc.), or a nitrate or nitrite salt (e.g., ammonium nitrate, ammonium nitrite, potassium nitrate, potassium nitrite, etc.). The phosphorous source may comprise aqueous phosphoric acid or a phosphate or phosphite salt (e.g., monobasic ammonium phosphate, ammonium biphosphate, tribasic ammonium phosphate, monobasic potassium phosphate, potassium biphosphate, tribasic potassium phosphate, mono-, di- or tribasic potassium or ammonium phosphite, etc.). The carbon source may comprise aqueous formic acid, acetic acid, urea, formamide, acetamide, ammonium formate, ammonium acetate, ammonium carbonate, potassium formate, potassium acetate, potassium carbonate, etc. The micronutrient(s) may be selected from the group consisting of zinc, iron, manganese, calcium, boron, magnesium, copper, cobalt and molybdenum. Frequently, the micronutrients comprise a water-soluble nitrate, formate, acetate, sulfate, phosphate or phosphonate salt, such as zinc nitrate, zinc formate, zinc acetate, zinc sulfate, manganese nitrate, manganese formate, manganese acetate, manganese sulfate, calcium nitrate, calcium ammonium nitrate, calcium acetate, magnesium nitrate, magnesium acetate, magnesium sulfate, copper nitrate, copper sulfate, cobalt nitrate, cobalt acetate, or cobalt sulfate, or a corresponding oxide and/or hydroxide of iron, manganese, magnesium, copper, cobalt or molybdenum, which may be solubilized or chelated with a chelating agent such as ethylene diamine tetraacetate (EDTA) or nitrilotriacetic acid (NTA), etc. Boron is typically added as boric acid or a water-soluble borate (e.g., ammonium tetraborate, lithium pentaborate, sodium tetraborate, zinc borate, etc.).

In some embodiments, adding the potassium bisulfate to the irrigation water comprises introducing the irrigation water into a mixing chamber, and separately injecting the potassium bisulfate into the mixing chamber. In such embodiments, the method may further comprise filtering at least part of the irrigation water to produce filtered irrigation water, and combining the mixture of potassium bisulfate and irrigation water with the filtered irrigation water prior to delivering the mixture of potassium bisulfate and irrigation water to the field. Alternatively, the method may further comprise filtering the irrigation water (e.g., all of the irrigation water) prior to adding the potassium bisulfate to the filtered irrigation water. In such an alternative method, adding the potassium bisulfate to the irrigation water may comprise injecting the potassium bisulfate into the filtered irrigation water.

In another aspect, the present invention concerns a method of providing potassium bisulfate to crops, comprising applying or spreading the potassium bisulfate (which may be in the solid phase) onto ground near or proximate to the crops, and allowing water to carry the potassium bisulfate (e.g., by dissolving the potassium bisulfate) into the ground, and preferably, to the root system of the crops. In some embodiments, solid potassium bisulfate is spread (e.g., manually using a shovel, or using a conventional solid fertilizer spreader), and in other embodiments, a solution (e.g., a concentrated solution) of potassium bisulfate is applied (e.g., field-sprayed) using a conventional sprayer or spraying system. Typically, the potassium bisulfate is applied or spread onto the ground at a rate of 10-500 lbs./acre (11-560 kg/hectare, or 1.1-56 g/m$^2$) as $K_2O$, or any rate or range of rates therein.

The present invention advantageously provides potassium to crops in a relatively safe manner (e.g., relative to KOH and sulfuric acid), with considerably less heat released into the irrigation water and with considerably increased solubility. The present invention also advantageously provides an irrigation line/equipment cleaner that also serves as an essential fertilizer/nutrient to crops. The present method(s) also enable relatively low-cost approaches to delivering potassium to crops and releasing certain minerals from the soil to the crops. The present invention also provides other advantages as described below.

These and other advantages of the present invention will become readily apparent from the detailed description of various embodiments below.

DETAILED DESCRIPTION

Figure 1:
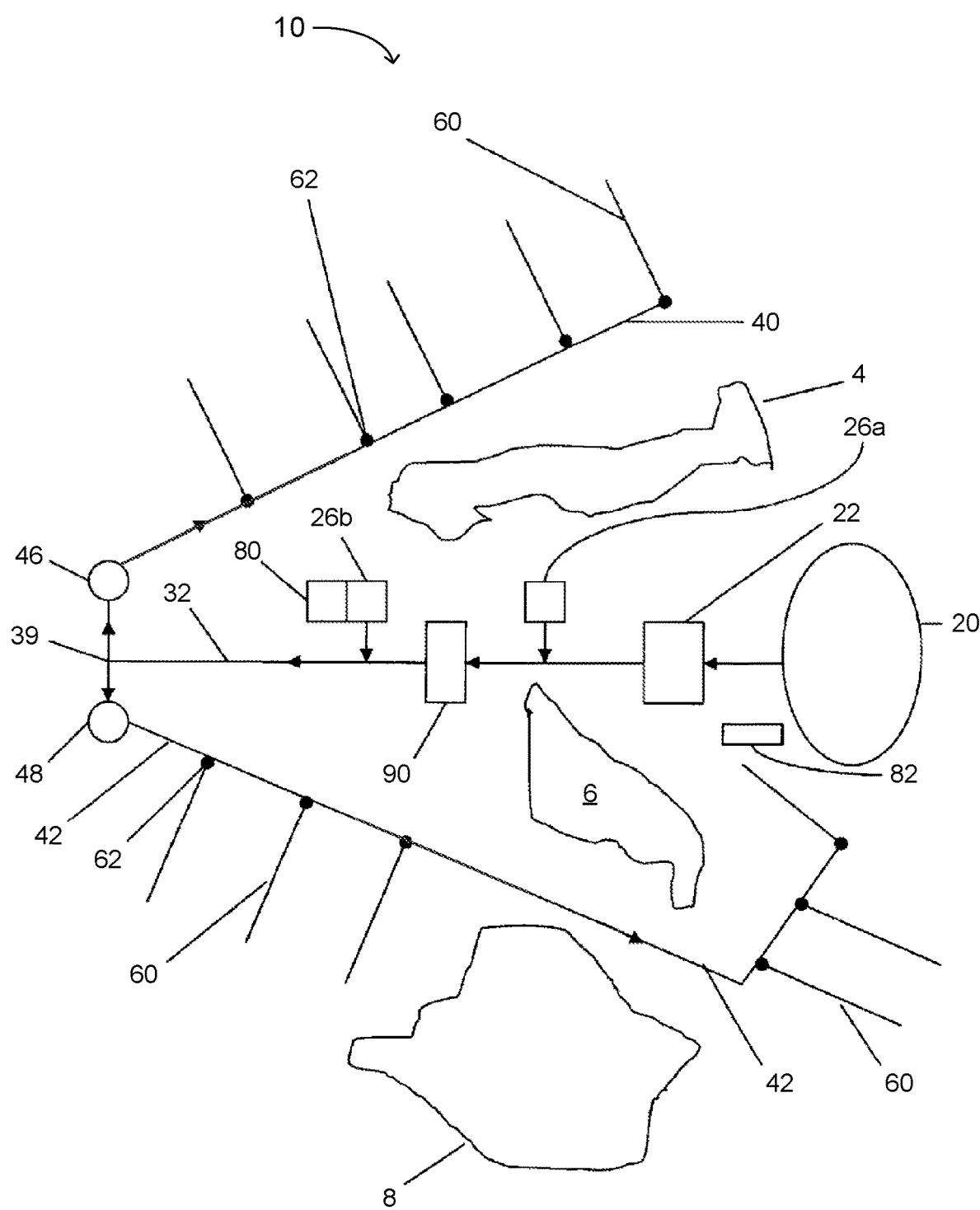
FIG. 1 is a diagram of a conventional fertigation system.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims.

Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "data" and "information" are generally used interchangeably herein, but are generally given their art-recognized meanings. Also, for convenience and simplicity, the terms "location" and "site" may be used interchangeably, as may the terms "connected to," "coupled with," "coupled to," and "in communication with," but these terms are also generally given their art-recognized meanings.

The invention, in its various aspects, will be explained in greater detail below with regard to exemplary embodiments.

An Exemplary Method of Fertigation Using Potassium Bisulfate

A First Exemplary Method of Adding Potassium Bisulfate to Irrigation Water

In a first exemplary method, potassium bisulfate may be added to the irrigation water by separately adding (1) sulfuric acid and (2) an aqueous solution of potassium sulfate to the irrigation water, either directly or in a mixing chamber. In some embodiments, adding the sulfuric acid and the aqueous solution of potassium sulfate to the irrigation water comprises introducing the irrigation water into the mixing chamber, and separately injecting the sulfuric acid and the aqueous solution of potassium sulfate into the mixing chamber. In such embodiments, the method may further comprise filtering at least part of the irrigation water to produce filtered irrigation water, and combining the mixture of sulfuric acid, potassium sulfate and irrigation water (which, as is explained above, is actually an aqueous solution of potassium ions, hydrogen or hydronium ions, and sulfate ions, perhaps with a small amount of bisulfate ions present, depending on the pH) with the filtered irrigation water, prior to delivering the mixture and the filtered irrigation water to the field.

Alternatively, the method may further comprise filtering the irrigation water (e.g., all of the irrigation water) prior to adding the sulfuric acid and the aqueous solution of potassium sulfate to the filtered irrigation water. In this alternative, adding the sulfuric acid and the aqueous potassium sulfate may comprise injecting the sulfuric acid and, separately, injecting the aqueous solution of potassium sulfate into the filtered irrigation water.

Figure 2:
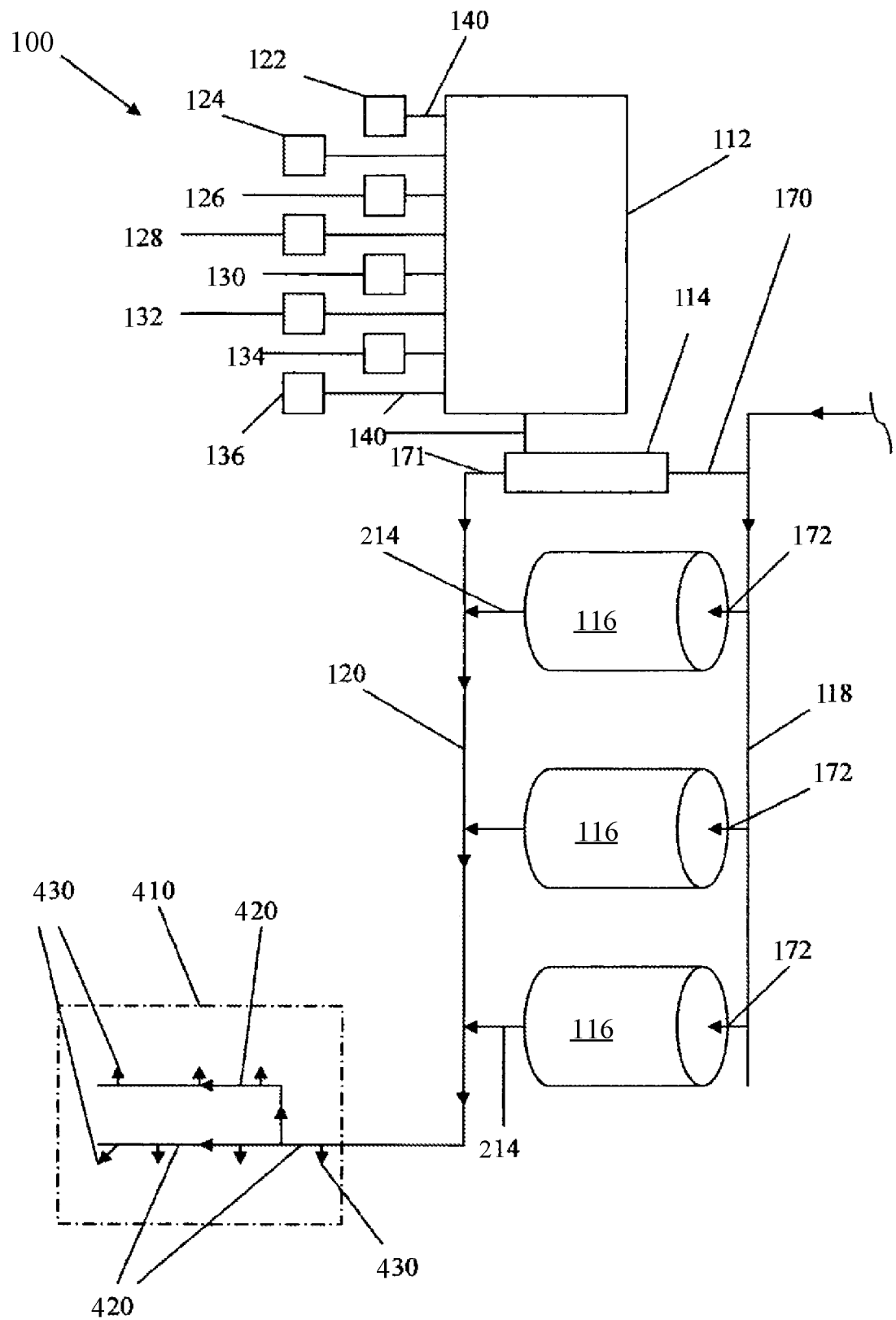
FIG. 2 is a diagram of an alternative conventional fertigation system.
Figure 3:
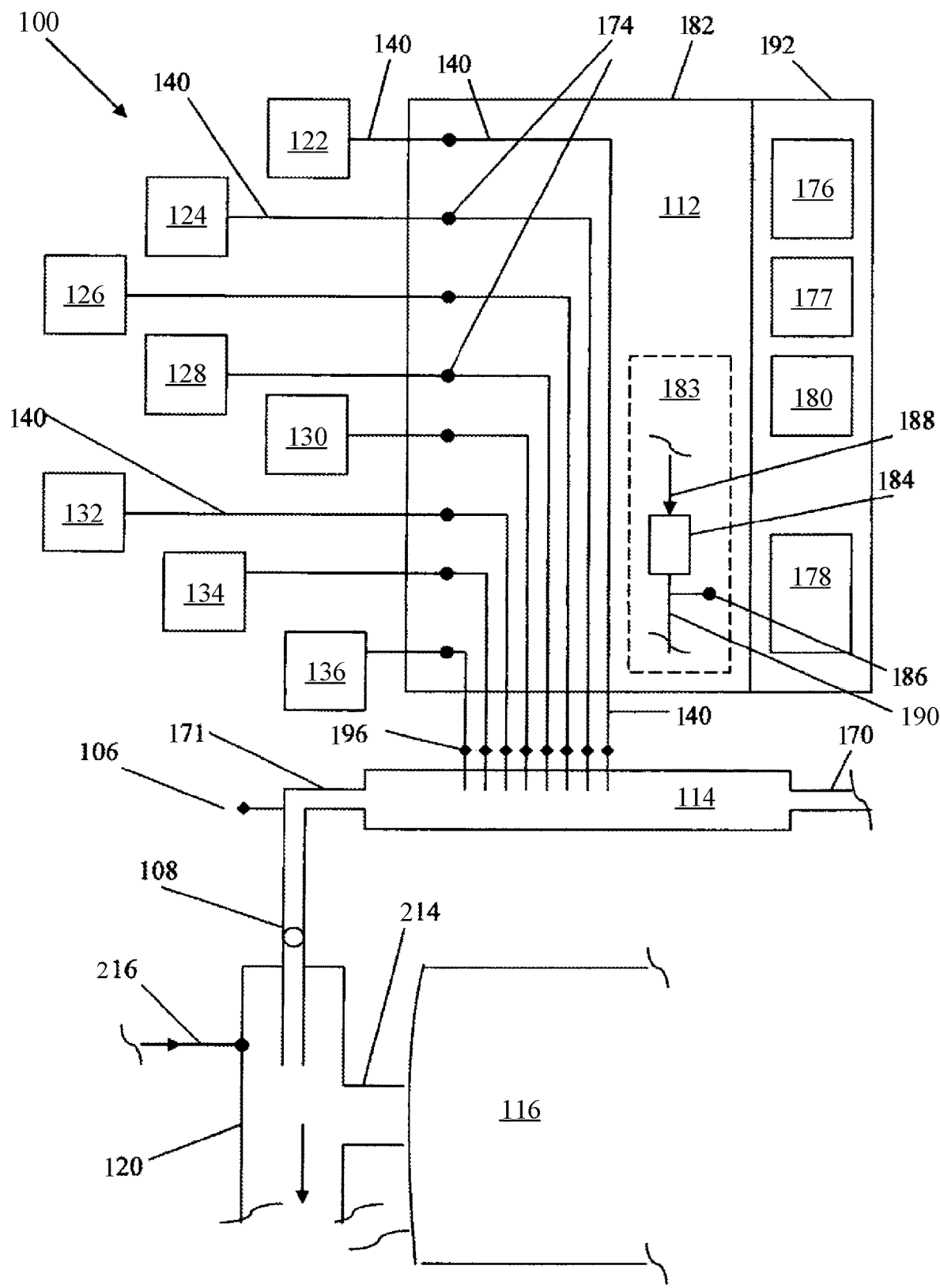
FIG. 3 is a diagram showing components in the fertigation system of FIG. 2 in which fertilizers and micronutrients are mixed and added to irrigation water.
Figure 4:
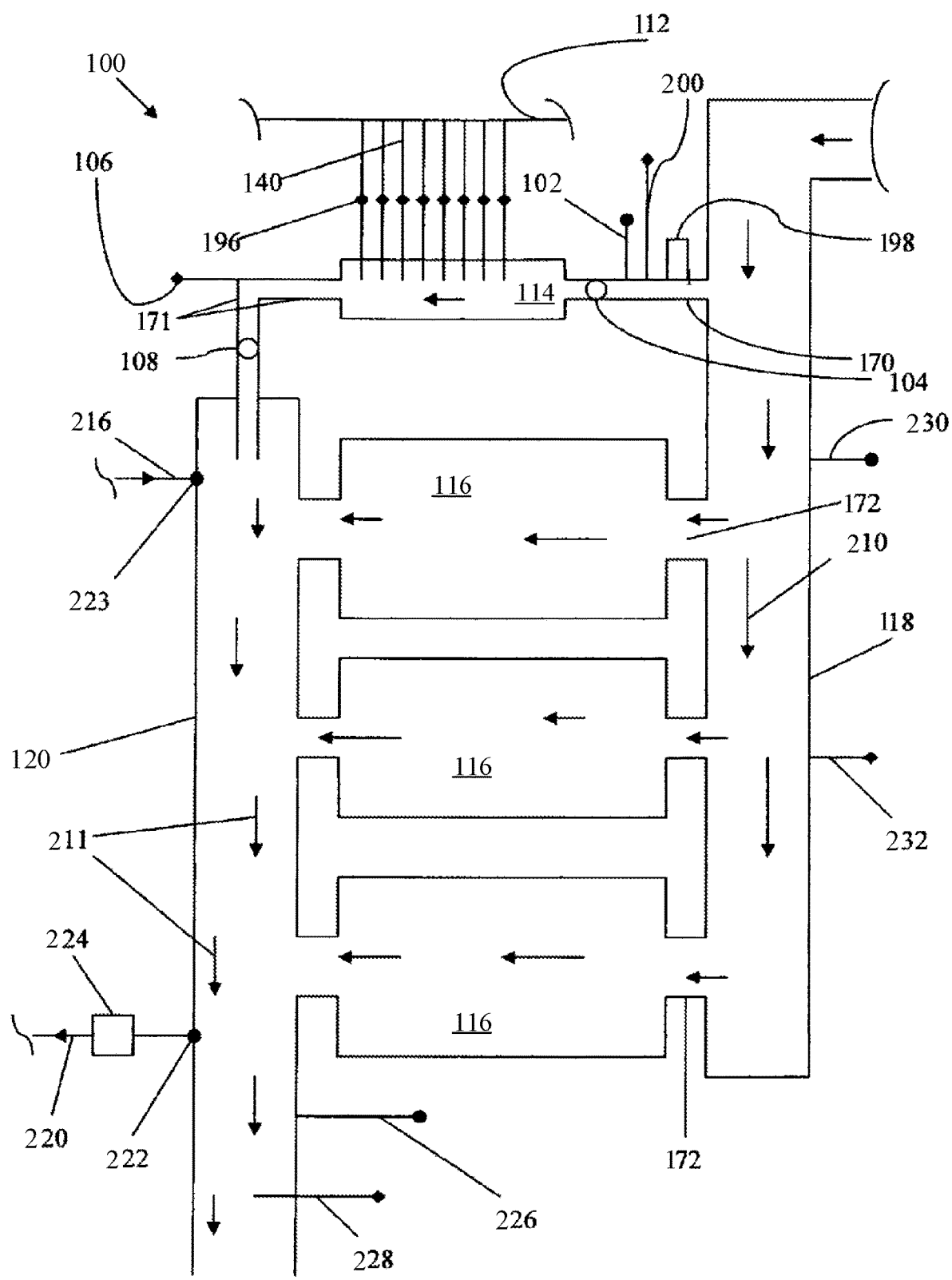
FIG. 4 is a diagram showing components in the fertigation system of FIG. 2 in which the irrigation water is filtered and the mixed fertilizers and micronutrients are added to the filtered irrigation water.
Figure 5:
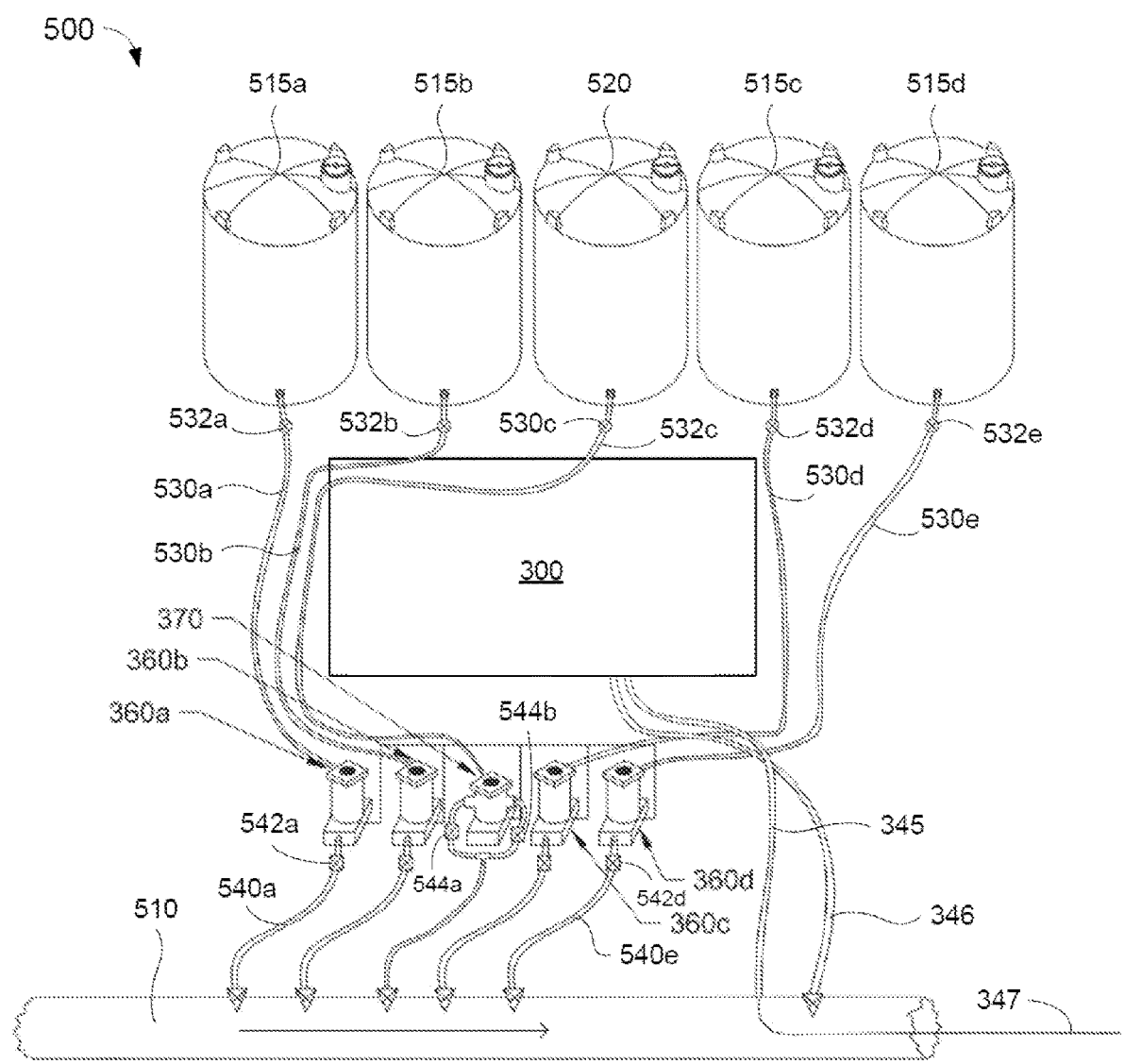
FIG. 5 shows an automatic fertilization and/or irrigation system that can monitor and adjust the pH of treated irrigation water.

In other or further embodiments, the sulfuric acid and the aqueous solution of potassium sulfate may be added to the irrigation water over a predetermined period of time using first and second pumps. For example, the pumps may each comprise a pump (or, together, an injection system) 26b in the irrigation/fertigation system 10 in FIG. 1, a feed pump 174 in the system 100 in FIGS. 2-4, or one of the pumps 515a-d or 520 in FIG. 5. In such cases, the method may further comprise controlling one or more settings of the first and second pumps using a controller (e.g., controller 300) in electrical communication with the pumps. The setting(s) of the first and second pumps are configured to provide the predetermined amount of sulfuric acid and the aqueous solution of potassium sulfate to the irrigation water over the predetermined period of time. The first and second pumps may deliver the sulfuric acid and the aqueous solution of potassium sulfate for a length of time of from 1 hour to 8 hours, or any length of time or range of lengths of time therein (e.g., 4-8 hours).

For example, the aqueous solution of potassium sulfate may be added in an amount sufficient to provide the irrigation water with a concentration of potassium (as $K_2O$) of from 1 to 1000 ppm, or any concentration or range of concentrations therein (e.g., 2 to 500, about to 100, etc.). However, the sulfuric acid is also added in an amount providing a similar concentration of sulfate anions ($SO_4^{2-}$) to the irrigation water. Thus, the molar ratio of sulfuric acid to potassium sulfate added to the irrigation water should be about 1:1 (e.g., 1.2:1 to 0.8:1, or any ratio or range of ratios therein, such as 1.1:1 to 0.9:1, etc.). In such embodiments, the sulfuric acid and the potassium sulfate generally form potassium ions ($K^+$), hydrogen ($H^+$) and/or hydronium ions ($H_3O^+$), sulfate ions, and possibly a small amount of bisulfate ions ($HSO_4^-$) in the irrigation water. At a relatively low pH (e.g., 1-4.5), there are likely trace amounts of bisulfate ions ($HSO_4^-$) in the irrigation water. However, at a higher pH (e.g., 6.5-7.5), there are essentially no bisulfate ions ($HSO_4^-$) in the irrigation water. Thus, the sulfuric acid and the potassium sulfate may be added to the irrigation water in amounts that form (1) potassium ions and (2) hydrogen and/or hydronium ions in the irrigation water in a molar ratio of 1.2:1 to 0.9:1, or (1) potassium ions and (2) sulfate ions in the irrigation water in a molar ratio of 1.25:1 to Prior to addition to the irrigation water, the sulfuric acid may be stored in a first tank or vessel (e.g., tank 80 in FIG. 1, one of the tanks 122-136 in FIG. 2, or tank 520 in FIG. 5) as concentrated (i.e., 93-98% by weight) sulfuric acid, or as a relatively dilute solution in water (e.g., containing 25-80% by weight of sulfuric acid). Although the relatively dilute solutions are safer to handle than concentrated sulfuric acid, a relatively dilute solution of sulfuric acid needs to be added to the tank or vessel more frequently. Similarly, prior to addition to the irrigation water, the aqueous solution of potassium sulfate may be may be stored in a second tank or vessel (e.g., tank 80 in FIG. 1, one of the tanks 122-136 in FIG. 2, or one of the tanks 515a-d in FIG. 5) as a solution of 1-12% by weight of potassium sulfate in water, or any concentration or range of concentrations therein (e.g., 2-10%, 3-8%, etc., by weight of potassium sulfate). The tanks or vessels are generally in fluid communication with the mixing chamber or a pipe or other conduit carrying the irrigation water. The water may be purified (e.g., by reverse osmosis), filtered, distilled and/or deionized prior to use in the solution of potassium sulfate.

In some embodiments, adding the sulfuric acid and the aqueous solution of potassium sulfate to the irrigation water may result in the irrigation water having a pH in a range of from 4.5 to 6.5. For example, the pH of the irrigation water after adding the sulfuric acid and the aqueous solution of potassium sulfate may be from 4.5 to about 5.5, or any other value or range of values in the range of from 4.5 to 6.5 (e.g., 4.5-5.0). At higher concentrations, and/or with the addition of one or more additional acids such as phosphoric acid, nitric acid, formic acid, acetic acid and the like, the pH of the irrigation water can be in the range of 2.0-4.5 (e.g., 2.5-3.5, or any other value or range of values therein). At such a low pH range, the potassium bisulfate-containing irrigation water can effectively remove scale (e.g., calcium carbonate and/or calcium oxide). Exemplary methods of removing scale and other contamination from irrigation equipment and irrigation conduits are disclosed in U.S. Pat. Nos. 8,821,646, 10,046,369 and the relevant portions of which are incorporated herein by reference. In such cases, the potassium bisulfate-containing irrigation water should stay in the irrigation equipment and conduits for a minimum of 2-3 hours before flushing (e.g., with filtered, optionally chlorinated, and optionally potassium bisulfate-free, irrigation water). Alternatively, the method may further comprise adjusting the pH of the irrigation water, either during or after the addition of the sulfuric acid and the aqueous solution of potassium sulfate, to a value in the range of 5.0-7.5, or any value or range of values therein (e.g., 6.5-7.4).

A Second Exemplary Method of Adding Potassium Bisulfate to Irrigation Water

In a second exemplary method, adding the potassium bisulfate may comprise adding an aqueous solution of potassium bisulfate to the irrigation water, either directly or in a mixing chamber. Thus, similar to the first exemplary method, in some embodiments, adding the aqueous solution of potassium bisulfate to the irrigation water comprises introducing the irrigation water into the mixing chamber, and injecting the aqueous solution of potassium bisulfate into the mixing chamber. Such embodiments may further comprise filtering at least part of the irrigation water, and combining the mixture of potassium bisulfate and irrigation water (which, as is explained above, is actually an aqueous mixture or solution of potassium ions, hydrogen or hydronium ions, and sulfate ions, perhaps with a small amount of bisulfate ions present) with the filtered irrigation water, prior to delivering the mixture and the filtered irrigation water to the field. Alternatively, the method may further comprise filtering some or all of the irrigation water prior to adding the aqueous solution of potassium bisulfate to the filtered irrigation water (e.g., by injection).

In other or further embodiments, the aqueous solution of potassium bisulfate may be added to the irrigation water over a predetermined period of time using a pump. For example, the pump may comprise the pump or injection system 26b in the irrigation/fertigation system 10 in FIG. 1, a feed pump 174 in the system 100 in FIGS. 2-4, or one of the pumps 515a-d in FIG. 5. The pump may deliver the aqueous solution of potassium bisulfate providing such a concentration of potassium for a length of time of from 1 hour to 8 hours, or any length of time or range of lengths of time therein (e.g., 4-8 hours). In such cases, the method may further comprise controlling one or more settings of the first and second pumps using a controller (e.g., controller 300) in electrical communication with the pump. The setting(s) of the pump are configured to provide the predetermined amount of the aqueous solution of potassium bisulfate to the irrigation water over the predetermined period of time. For example, the aqueous solution of potassium bisulfate may be added in an amount sufficient to provide the irrigation water with a concentration of potassium (as $K_2O$) of from 1 to 1000 ppm, or any concentration or range of concentrations therein (e.g., 2 to 500, about 5 to 100, etc.).

Prior to addition to the irrigation water, the aqueous solution of potassium bisulfate may be stored in a tank or vessel (e.g., tank 80 in FIG. 1, one of the tanks 122-136 in FIG. 2, or one of the tanks 515*a-d* in FIG. 5) in fluid communication with the mixing chamber or a pipe or other conduit carrying the irrigation water. The potassium bisulfate may be present in the solution in a concentration of 1-35% by weight, or any concentration or range of concentrations therein (e.g., 5-35% by weight). Given that potassium bisulfate is more soluble in water than is potassium sulfate (which has a maximum solubility of ~12 g/100 ml of water), in some embodiments, the potassium bisulfate solution added to the irrigation water has a concentration of 10-35% by weight, 12-33% by weight, 15-30% by weight, etc.

As for the first exemplary method, adding the aqueous solution of potassium bisulfate to the irrigation water may result in the irrigation water having a pH in a range of from 4.5 to 6.5. For example, the pH of the irrigation water after adding the aqueous solution of potassium bisulfate may be from 4.5 to about 5.5, or any other value or range of values in the range of from 4.5 to 6.5 (e.g., 4.5-5.0), or from 2.0 to 4.5, or any other value or range of values in (e.g., for cleaning and/or removing scale in the fertigation system). Alternatively, the method may further comprise adjusting the pH of the irrigation water, either during or after the addition of the aqueous solution of potassium sulfate, to a value in the range of 5.0-7.5, or any value or range of values therein (e.g., 6.5-7.4).

Exemplary Fertilizers, Nutrients and Micronutrients

The present method may further comprise adding to the irrigation water any water-soluble fertilizer, nutrient, micronutrient, or combination thereof. Typical fertilizers and nutrients may include sources of elements such as nitrogen and phosphorus, optional sources of elements such as calcium, sulfur, magnesium and carbon, soluble organic materials, soluble soil amendments, microbiologicals, etc.

Sources of nitrogen may include water-soluble compounds such as ammonia (which can also be a base), ammonium nitrate and ammonium chloride; urea, formamide, acetamide and ammonium carbonate (each of which can also be a source of carbon); ammonium phosphate (which can also be a source of phosphorous), ammonium sulfate (which can also be a source of sulfur), and alkaline earth ammonium halides such as calcium ammonium chloride and calcium ammonium nitrate (which can also be a source of calcium), magnesium ammonium chloride and magnesium ammonium nitrate (which can also be a source of magnesium), etc. Sources of phosphorus may include phosphoric acid and phosphonic acid (each of which can also be an acid), ammonium phosphate, ammonium phosphonate, alkali metal mono-, di- and tribasic phosphates and phosphonates such as lithium mono-, di- and tribasic phosphates, sodium mono-, di- and tribasic phosphates, and potassium mono-, di- and tribasic phosphates and phosphonates (which can also be a source of potassium), etc. Additional sources of potassium may include potassium carbonate and potassium bicarbonate (each of which can also be a base and/or a source of carbon), potash, potassium chloride, potassium nitrate (which can also be a source of nitrogen), potassium phosphate, and potassium thiosulfate (which can also be a source of sulfur), etc.

Potassium bisulfate is a source of sulfur. However, if needed, additional sources of sulfur may include ammonium sulfate and ammonium sulfite (each of which can also be a source of nitrogen), alkali metal sulfites (such as potassium sulfite, which is also a source of potassium), alkaline earth sulfates and sulfites (which, in the cases of calcium and magnesium, can also provide a source of calcium and magnesium, respectively), etc.

Sources of calcium may include calcium nitrate, calcium ammonium nitrate and calcium ammonium chloride (each of which can also be a source of nitrogen), calcium chloride, dibasic calcium phosphate (which can also be a source of phosphorous), calcium formate and calcium acetate (each of which can also be a source of carbon), and calcium thiosulfate (which can also be a source of sulfur), etc. Sources of magnesium may include magnesium chloride, magnesium formate and magnesium acetate (each of which can also be a source of carbon), magnesium sulfate and magnesium thiosulfate (each of which can also be a source of sulfur), etc. Sources of carbon may include, in addition to those listed herein, carbon dioxide (carbonic acid), formic acid, acetic acid, oxalic acid, malonic acid, acetoacetic acid (3-oxobutyric acid), etc., alkali metal and alkaline earth metal salts thereof, soluble carbohydrates, etc.

Micronutrients include sources of certain minerals and elements that are applied in relatively low concentrations (e.g., at molar ratios of 1:20 or less, 1:50 or less, 1:100 or less, 1:200 or less, etc., relative to each fertilizer and/or nutrient), and may include sources of elements such as boron, iron, cobalt, copper, manganese, molybdenum and zinc, and, to the extent not included in the fertilizers and nutrients, sources of calcium, sulfur, magnesium and carbon. Micronutrients such as boron, iron, cobalt, copper, manganese, molybdenum and zinc may be present as a nitrate salt, a water-soluble complex or chelate (e.g., using ammonia, EDTA, NTA, oxalic acid, malonic acid or a dialkyl ester thereof, etc.) of an oxide or hydroxide thereof, and in the cases of the metals, a corresponding halide salt (alone or as a complex with, e.g., ammonia, water, etc., and/or chelated with EDTA, NTA, oxalic acid, malonic acid or a dialkyl ester thereof, etc.), sulfate, formate, acetate, oxalate, etc.

Other components that may be included water-soluble pesticides, herbicides (e.g., that are selective for weeds and relatively less toxic or non-toxic to the crop[s]), antifungal agents, antimicrobial agents and/or other biocides (e.g., ammonium phosphite), antiviral agents, antiscaling agents, etc.

For additional economic benefit, it may be beneficial to add incompatible fertilizers together at the site of the potassium bisulfate addition (e.g., in the irrigation water) to reduce or prevent scaling and/or plugging, as some fertilizers and/or nutrients may form insoluble or sparingly soluble precipitates when combined. For example, calcium phosphate is substantially insoluble in pH-neutral water, but equivalent species may be synthesized in situ in the irrigation water, for example by combining calcium nitrate solution (75% by weight) with phosphoric acid solution (75% by weight) at certain dilutions and/or concentrations and at mildly acidic pH (e.g., ≥6.0 but <7.0):

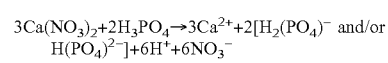

As mentioned above, any fertilizer, nutrient or micronutrient may be added to the irrigation water. Thus, any commercial, water-soluble fertilizer may be fed alone or in combination with other water-soluble fertilizers, nutrients and additives, by fertigation (as described herein) or by slug feeding. As a result, standard fertilizers such as CAN-17, UAN-32, CN-9, N-pHuric, AN-20, Thiocal, potassium thiosulfate, urea, potash, phosphoric acid, and other commodity/commercially available fertilizers and additives may be applied simultaneously with the potassium bisulfate in the irrigation water.

Exemplary Operations of the Fertigation System

Before the fertigation system is operated, the storage tanks are installed and filled with fertilizers, nutrients and/or micronutrients in known concentrations and amounts. In some embodiments, site information (e.g., nutrient targets, irrigation cycles and/or times, etc.) may be entered into a programmable logic controller (PLC).

Initiation and/or startup of the system may comprise the following steps. First, the irrigation water pump is turned on, and the irrigation water begins to flow through the main irrigation line. Next, the PLC senses water flow and pressure in the main irrigation line, as described herein. Once the required flow and pressure is achieved in the main irrigation line, the PLC may begin to control a first pump that adds acid or base (e.g., potassium bisulfate, sulfuric acid or aqueous KOH) to the main irrigation line to bring the pH of the irrigation water to a target pH, while monitoring the pH of the irrigation water, continuously or periodically. The addition of acid or base may be controlled (e.g., adjusted, increased or decreased slowly) until a stable pH at the target value, plus or minus a predetermined margin (e.g., $\leq \pm 0.5$) is achieved.

Although any target pH may be achieved, crops in a particular region tend to metabolize most fertilizers, nutrients and micronutrients most efficiently at a particular pH. For example, in California, irrigation water may have a pH in the range of 7.5-8.5, but many crops metabolize most or all fertilizers, nutrients and micronutrients most efficiently at a pH of about 6.5 (e.g., 6.5±0.5, 6.5±0.3, 6.5±0.2, or any other range within the target pH±0.5). Thus, in California, the target pH may be about 6.5, and the PLC controls the rate of addition of potassium bisulfate to the irrigation water until the irrigation water is at the target pH or in the target pH range for a predetermined minimum period of time (e.g., 1 minute, 5 minutes, 15 minutes, 1 hour, or any other minimum length of time of at least 1 minute). Alternatively, the PLC may control the addition of potassium bisulfate to the irrigation water until the irrigation water is at a target pH in the range of 4.0-5.5, 2.0-4.0, etc., as described herein.

Once the target pH is achieved (or when the required flow and pressure is achieved in the main irrigation line), the PLC begins adding, then controlling the rate of addition of, one or more fertilizers, nutrients and/or micronutrients using one or more additional pumps. The fertilizer(s), nutrient(s) and/or micronutrient(s) may be as described herein. For example, the PLC may add, then control the rate of addition of, first, second, third and fourth fertilizers, nutrients and/or micronutrients by first, second, third and fourth pumps. When one of the fertilizers, nutrients and/or micronutrients is or comprises phosphoric acid, the pH of the irrigation water may decrease, so the PLC may adjust the rate of base using the corresponding pump to bring the pH back to the target pH or pH range. In some cases, the PLC may increase or decrease the rate of addition of acid or base, but precautions can be taken not to overfeed a corresponding fertilizer and/or nutrient at any time or underfeed a corresponding fertilizer and/or nutrient over a prolonged period of time.

Once the target levels of potassium-, nitrogen- and phosphorus-containing fertilizers and/or nutrients are achieved, the PLC may determine that a target rate or amount of calcium, carbon, sulfur, or micronutrients (e.g., a mixture of magnesium, boron, iron, cobalt, copper, manganese, molybdenum and/or zinc) may not yet be met. The PLC may then begin adding, then controlling the rate of addition of, a calcium-containing fertilizer and/or nutrient, a carbon-containing fertilizer or nutrient, a sulfur-containing fertilizer or nutrient, and/or the micronutrients using one or more corresponding pumps, and adjusting the rate of addition with the corresponding pump(s) until the target level(s) of fertilizer(s), nutrient(s) or micronutrients are achieved in the irrigation water. Throughout this process, the irrigation water is maintained at the target pH or in the target pH range, as described herein.

When the main irrigation water pump shuts off, the PLC may sense a decrease in pressure in the main irrigation water line, and may consequently shut down all of the pumps. In some embodiments, the PLC shuts down the pumps slowly (e.g., in accordance with predetermined decreases, or a predetermined rate of decrease, in the pressure or flow rate in the main irrigation water line). The system (including the PLC) may do so while maintaining the pH of the irrigation water at the target pH. When the PLC determines a no-flow condition, the pumps are turned off, and the irrigation system is shut down.

The PLC may send a report to an email account (using the wireless switch or router) specifying the levels or amounts of potassium bisulfate and other fertilizer(s), nutrient(s) and/or micronutrient(s) added to the irrigation water. For example, the levels (or amounts per unit area) of the potassium bisulfate and other fertilizers, nutrients and micronutrients may be calculated and reported in units of lbs./acre (e.g., to the nearest 0.1 lb./acre), $kg/km^2$, $mg/m^2$, etc. When the email is received by a remote computer adapted to receive and process such reports, if the report contains no errors (e.g., errors that are detectable by the remote computer having a software program or app thereon configured to receive and process such reports), then the report may be automatically forwarded to one or more further recipients (e.g., a customer, an account manager, a field technician, etc.).

In some cases, the irrigation water pump may be turned on or off (e.g., manually) for a period of time different from that specified in the programming or data entered into the PLC. In such cases, the system has no control or advance knowledge of the time interval during which the irrigation pump is run or operated, but can respond adjustably to underfeeds and overfeeds resulting from a difference between the expected and actual time intervals of operation.

For example, the PLC may be programmed to calculate feed rates of the potassium bisulfate and other fertilizers, nutrients and/or micronutrients for a given day based on an expected 8-hour irrigation schedule. However, for example, a grower, field manager or field technician may actually run the irrigation water pump for 7 hours or 9 hours on the given day. In this event, the PLC tracks the time interval(s) during which the pump is run or operated, and adjusts the feed rate of the fertilizer, nutrient and micronutrient pumps proportionally for the next scheduled irrigation day. In the example where the irrigation water pump is run for 7 hours, the feed rate of the fertilizer, nutrient and micronutrient pumps is increased to 114-115% ($8/7^{ths}$) of the programmed rate on the next scheduled irrigation day, and the example where the irrigation water pump is run for 9 hours on the given day, the feed rate of the fertilizer, nutrient and micronutrient pumps is decreased to 88-90% ($8/9^{ths}$) of the programmed rate on the next scheduled irrigation day. As a result, on the next irrigation day (or other period of time during which such adjustments and/or corrections are made), the PLC may correct for variations in the irrigation schedule in order to achieve the target rates over a longer period of time. If further changes occur, the PLC can maintain the desired profile by slowly making the appropriate changes or adjustments. In general, the longer the time period for such changes or adjustments, the greater the likelihood of avoiding any undesired spikes in the potassium bisulfate or other fertilizer/nutrient feed rate.

The system can turn on and off any fertilizer, nutrient or micronutrient in accordance with predetermined and/or calculated targets and schedules (e.g., the fertigation profile). For example, the system may keep the pump for supplying phosphorous-based fertilizers and/or nutrients off until a predetermined starting time in the growing season arrives. The user (e.g., a data analyst or other user of the remote computer) typically makes a change to a target or schedule only when conditions such as weather or crop growth necessitate such a change (e.g., to the fertigation profile). Otherwise, the system (and thus, the present method) can control the addition of potassium bisulfate and other fertilizers, nutrients and/or micronutrients according to the initial (or modified) fertigation profile for the growing season.

Slug feeding potassium bisulfate to agricultural crops in a field using any of the systems described herein and either of the first or second methods described above may comprise adding the potassium bisulfate to the irrigation water such that the concentration of potassium in the irrigation water is from on the order of 1000 ppm to about 1% by weight, but generally less than 1% by weight to avoid risks associated with water having an unusually low pH (e.g., about 2.5 or less), then providing or delivering the combination of the potassium bisulfate and the irrigation water to the crops. In some embodiments, the combination of the potassium bisulfate and the irrigation water is further combined with additional irrigation water (which may or may not be filtered) to the crops.

Slug feeding the potassium bisulfate to the crops may further comprise adding a base (e.g., an aqueous solution of KOH, $K_2CO_3$, $KHCO_3$, or $NH_4OH$, etc.) to the combination of the potassium bisulfate and the irrigation water, preferably until a target pH is reached, as described herein. After or during addition of the base, slug feeding may further comprise cooling the combination of the potassium bisulfate, the irrigation water, and the base (or the combination of the potassium bisulfate and the irrigation water at the target pH), for example by adding more irrigation water until the temperature of the combination decreases below a predetermined threshold. The combination of the potassium bisulfate and the irrigation water may be slug-fed to the crops by direct application (e.g., pouring the combination onto ground around or proximate to the crops), through a hose or pipe (e.g., connected to a tank or vessel containing the potassium bisulfate and the irrigation water), or other known methods.

An Exemplary Method of Applying Potassium Bisulfate to Crops

In another aspect, the present invention relates to an exemplary method of providing potassium bisulfate to crops, comprising applying or spreading the potassium bisulfate onto ground near or proximate to the crops, and allowing water to carry the potassium bisulfate into the ground, and preferably, to the root system of the crops. In some embodiments, the potassium bisulfate is applied or spread onto the ground in the solid phase. In other embodiments, the potassium bisulfate is applied or spread onto the ground as an aqueous solution. Such a solution may contain potassium bisulfate in a concentration of 3-35% by weight (i.e., 1-12% by weight as $K_2O$), or any concentration or range of concentrations therein (e.g., 10-35% by weight of potassium bisulfate, or 8.5-12% by weight as $K_2O$).

The potassium bisulfate may be carried into the ground and to the root system of the crops by dissolving the potassium bisulfate in water. In the case where the potassium bisulfate is applied as an aqueous solution, this process is already done. In the case where the potassium bisulfate is applied to the ground (or soil) as a solid-state material, dissolving the potassium bisulfate in water may comprise applying irrigation water to the ground or soil, or allowing the potassium bisulfate to dissolve in rain or other natural precipitation (e.g., dew, fog, hail, etc.). Applying irrigation water to the ground or soil may comprise spraying the irrigation water onto the crops and/or the ground around the crops, directing the irrigation water from an irrigation pipe, line or other conduit into a channel or other space along or between the crops, flooding a field containing the crops, or other conventional method of applying irrigation water to the ground or soil in which the crops are growing. Applying potassium bisulfate to the ground or soil as a solid-state material is particularly advantageous over potassium sulfate, as potassium bisulfate dissolves readily in water without mechanical agitation (and at relatively high concentrations, without significantly prolonged mechanical agitation), unlike potassium sulfate.

Typically, the potassium bisulfate is applied or spread onto the ground at a rate of lbs./acre (11-560 kg/hectare, or 1.1-56 $g/m^2$) as $K_2O$, or any rate or range of rates therein. This translates roughly to a rate of 29-1500 lbs./acre (32-1600 kg/hectare, or 3.2-160 $g/m^2$) of potassium bisulfate. Although a higher application rate of potassium bisulfate leads to a lower soil pH, and thus a greater release of certain minerals (e.g., micronutrients) for absorption by the crops, too low of a soil pH may damage certain crops. Accordingly, in some embodiments, the potassium bisulfate may be applied or spread onto the ground or soil at a rate of 50-250 lbs./acre (56-280 kg/hectare, or 5.6-28 $g/m^2$) as $K_2O$, 150-500 lbs./acre of potassium bisulfate per se, or any rate or range of rates therein.

In this aspect of the invention, the potassium bisulfate may be applied or spread onto the ground more than once during a crop season. For example, potassium bisulfate may be applied or spread onto the ground or soil at the beginning of the crop season (e.g., within 7-14 days of planting the crops), and either once or twice in the fall and/or winter (e.g., once in the fall, at or after the end of the crop season, and again in the winter, while the field and/or crops are dormant).

CONCLUSION/SUMMARY

The present invention advantageously provides potassium to crops in a relatively safe manner (e.g., relative to KOH and sulfuric acid), with considerably less exothermic energy released into the irrigation water, with considerably increased solubility, and enabling increased release of certain minerals (e.g., micronutrient) from the soil to the crops. The present invention also advantageously cleans irrigation lines and equipment, while also serving as an essential fertilizer/nutrient to crops. The present method(s) also enable relatively low-cost approaches to delivering potassium to crops (e.g., by slug feeding and/or field spreading).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of fertilizing and/or irrigating a field, comprising:
   adding a predetermined amount of potassium bisulfate to irrigation water for the field, wherein adding the potassium bisulfate comprises adding amounts of (1) sulfuric acid and (2) an aqueous solution of potassium sulfate to the irrigation water providing a molar ratio of sulfuric acid to potassium sulfate of 1.2:1 to 0.8:1; and
   delivering the mixture of potassium bisulfate and irrigation water to the field.

2. The method of claim 1, wherein the predetermined amount of potassium bisulfate is added to the irrigation water and/or the mixture of potassium bisulfate and irrigation water is delivered to the field continuously for a length of time of from 2 to 8 hours.

3. The method of claim 2, further comprising repeating the method every x days or y days per week over z days, wherein x is an integer of 1 to 7, y is an integer of 1 to 3, and z is an integer of at least 14.

4. The method of claim 1, further comprising adding a nitrogen source, a phosphorous source, a carbon source, and/or one or more micronutrients to the irrigation water.

5. The method of claim 4, comprising adding the nitrogen source, the phosphorous source, and the one or more micronutrients to the irrigation water, wherein the one or more micronutrients are selected from the group consisting of zinc, iron, manganese, calcium, boron, magnesium, copper, cobalt and molybdenum.

6. The method of claim 1, wherein the molar ratio of sulfuric acid to potassium sulfate forms (1) potassium ions and (2) hydrogen and/or hydronium ions in the irrigation water in a ratio of 1.2:1 to 0.9:1.

7. The method of claim 1, wherein adding the potassium bisulfate to the irrigation water results in the irrigation water having a pH of 4.5 to 6.5.

8. The method of claim 1, wherein adding the potassium bisulfate to the irrigation water comprises slug-feeding the potassium bisulfate to the irrigation water.

9. The method of claim 1, further comprising filtering the irrigation water prior to adding the potassium bisulfate to the irrigation water.

* * * * *